US012533700B2

(12) United States Patent
Woo et al.

(10) Patent No.: US 12,533,700 B2
(45) Date of Patent: Jan. 27, 2026

(54) ADHESIVE APPLICATOR FOR MANUFACTURING CORE, CORE MANUFACTURING APPARATUS, AND ADHESIVE APPLICATION METHOD USING SAME

(71) Applicant: POSCO MOBILITY SOLUTION CORPORATION, Cheonan-si (KR)

(72) Inventors: Duk Kyoun Woo, Cheonan-si (KR); Jung Gyu Chi, Cheonan-si (KR); Jae Sang Kwon, Pyeongtaek-si (KR); I Gyeong Hong, Bucheon-si (KR); Jeong Il Lee, Asan-si (KR); Sung Jin Choi, Cheonan-si (KR); Yagob Lee, Cheonan-si (KR); Suk Jo Kang, Asan-si (KR); Chang Il Choi, Cheonan-si (KR)

(73) Assignee: POSCO MOBILITY SOLUTION CORPORATION, Cheonan-si (KR)

( * ) Notice: Subject to any disclaimer, the term of this patent is extended or adjusted under 35 U.S.C. 154(b) by 93 days.

(21) Appl. No.: 18/268,592

(22) PCT Filed: Nov. 26, 2021

(86) PCT No.: PCT/KR2021/017604
§ 371 (c)(1),
(2) Date: Jun. 20, 2023

(87) PCT Pub. No.: WO2023/095959
PCT Pub. Date: Jun. 1, 2023

(65) Prior Publication Data

US 2024/0033765 A1 Feb. 1, 2024

(30) Foreign Application Priority Data

Nov. 24, 2021 (KR) ........................ 10-2021-0163012

(51) Int. Cl.
*B05B 12/08* (2006.01)
*B05B 7/06* (2006.01)
(Continued)

(52) U.S. Cl.
CPC ............ *B05B 12/087* (2013.01); *B05B 7/065* (2013.01); *B05D 5/10* (2013.01); *B05D 7/24* (2013.01)

(58) Field of Classification Search
CPC ......... B05B 12/087; B05B 7/065; B05B 1/12; B05B 12/122; B05B 7/0483; B05B 14/30;
(Continued)

(56) References Cited

U.S. PATENT DOCUMENTS

2015/0239641 A1* 8/2015 Ikushima .......... B05C 17/00579 222/386

FOREIGN PATENT DOCUMENTS

JP H05-304037 A 11/1993
JP 2001-291627 A 10/2001
(Continued)

OTHER PUBLICATIONS

International Search Report in International Application No. PCT/KR2021/017604, dated Aug. 11, 2022, 2pages.

*Primary Examiner* — Alexander M Weddle
(74) *Attorney, Agent, or Firm* — Park, Kim & Suh, LLC

(57) ABSTRACT

The present invention discloses an adhesive applicator for manufacturing a core, a core manufacturing apparatus, and an adhesive application method using the same. The adhesive applicator includes: a nozzle body having at least one adhesive outlet; and a nozzle plug movably provided inside the nozzle body in order to open/close the adhesive outlet. The adhesive outlet includes a nozzle hole for discharging the adhesive from the inside to the outside of the nozzle body, and the nozzle plug includes a plug body movably
(Continued)

(a)

provided inside the nozzle body to selectively block the nozzle hole, and a plug tip formed to protrude on a fore-end surface of the plug body. The fore-end surface of the plug body has a flat surface which faces the nozzle hole and is orthogonal to an axis of the nozzle hole. According to the present invention, since processing precision and processing easiness of the nozzle plug for opening/closing the adhesive outlet and the adhesive outlet can be enhanced, an adhesive application amount applied to the material by the adhesive applicator having a plurality of adhesive outlets can be uniformly managed.

12 Claims, 8 Drawing Sheets

(51) Int. Cl.
*B05D 5/10* (2006.01)
*B05D 7/24* (2006.01)

(58) Field of Classification Search
CPC ... B05D 5/10; B05D 7/24; B05D 1/02; B05D 1/26; B05D 7/14; B05C 1/027; B05C 9/06; B05C 5/02; B05C 11/10; H01F 41/02; H02K 15/02; C09J 5/06
See application file for complete search history.

(56) References Cited

FOREIGN PATENT DOCUMENTS

| | | | | | |
|---|---|---|---|---|---|
| JP | 2004-023829 A | | 1/2004 | | |
| JP | 2007-082319 A | | 3/2007 | | |
| JP | 2009-297758 A | | 12/2009 | | |
| JP | 2019-205963 A | | 12/2019 | | |
| KR | 10-2008-0067426 A | | 7/2008 | | |
| KR | 10-2008-0067428 A | | 7/2008 | | |
| KR | 10-1566491 B1 | | 11/2015 | | |
| KR | 10-2015-0136877 A | | 12/2015 | | |
| KR | 10-2016-0005938 A | | 1/2016 | | |
| KR | 20160005938 A | * | 1/2016 | | |
| KR | 10-1659238 B1 | | 9/2016 | | |
| KR | 1922189 B1 | * | 11/2018 | ............... | B05B 1/14 |
| KR | 101922189 B1 | * | 11/2018 | | |
| KR | 10-2266485 B1 | | 6/2021 | | |

* cited by examiner (a)

(b)

ADHESIVE APPLICATOR FOR MANUFACTURING CORE, CORE MANUFACTURING APPARATUS, AND ADHESIVE APPLICATION METHOD USING SAME

CROSS-REFERENCE TO RELATED APPLICATIONS

This application is the National Stage filing under 35 U.S.C. 371 of International Application No. PCT/KR2021/017604, filed on Nov. 26, 2021, which claims the benefit of Korean Patent Application No. 10-2021-0163012, filed on Nov. 24, 2021, the contents of which are all hereby incorporated by reference herein in their entirety.

TECHNICAL FIELD

The present invention relates to an adhesive applicator for manufacturing a core, a core manufacturing apparatus, and an adhesive application method using the same, and more particularly, to an adhesive applicator for manufacturing a core, a core manufacturing apparatus, and an adhesive application method using the same, which form a core of a lamination structure, i.e., a laminated core by integrating laminas for core, i.e., laminar members by adhesion.

BACKGROUND ART

In general, a laminated core refers to a core of a laminated structure manufactured by integrating a plurality of laminar members also called iron core thin plates or core sheets. For example, the laminated core refers to a core structure manufactured by integrating the plurality of lamina members obtained by blanking a metal strip in the laminated structure.

The laminated core is used as cores of various devices such as a rotator such as a motor or a transformer or a core for an ignition system, and various methods for manufacturing the laminated core are known.

As a representative method for manufacturing the laminated core, when laminar members having a predetermined shape are continuously formed and laminated by using a progressive die, and a plurality of laminated laminar members are integrated, a core of the lamination structure, i.e., the laminated core can be manufactured.

As a method for integrating the laminar members, a tap fixing method using an interlock tap, a welding method using a welding, e.g., a laser welding, a rivet fixing method, etc., are known.

Examples of the tap fixing method which are disclosed in patent documents such as Korean Patent Laid-open Publication Nos. 10-2008-0067426 and 10-2008-0067428 have an iron loss problem, and a limit in embossing processing for forming the interlock tap while a material, i.e., a steel plate becomes thinner.

Recently, technology (adhesion method) for integrating the laminar members by the adhesion has been developed and used. For example, an invention that applies an adhesive on the surface of a metal strip supplied to the apparatus (die) for manufacturing the laminated core and manufactures the laminated core by the adhesion scheme by blanking the metal strip is disclosed in Korean Patent No. 10-1566491, and Japanese Patent Laid-open Publication No. 1993-304037 and Japanese Patent Laid-open Publication No. 2009-297758.

In addition, an invention that manufactures the laminated core by receiving and blanking a metal strip in a state of being coated with the adhesive is disclosed in patent documents such as Korean Parent No. 10-1659238, Japanese Patent Laid-open Publication No. 2001-291627 and Japanese Patent Laid-open Publication No. 2004-023829.

According to the adhesion method, while the laminar members pass through an internal space (lamination hole) of a laminator called a lamination unit in a laminated state, a plurality of laminar members can be integrated by interface (boundary surface) adhesion of the laminar members. FIG. 1, as a diagram illustrating an example of the laminar member and the laminated core, illustrates an example in which multiple sheets of laminar members L are laminated and bonded by various schemes to form a laminated core C.

According to the conventional adhesion method, core manufacturing cost can be reduced as compared with a scheme of manufacturing the laminated corer by using the laser welding and the adhesion method is known as technology capable of responding to the thin trend of a metal strip, that is, the steel plate.

In order to manufacture the laminated core by the adhesion way, that is, the adhesion method, when the adhesive is applied to a plurality of points in a dot form for each forming portion of the laminar member, and interface adhesion of the laminar members is not evenly and uniformly made, the laminated core can be split on an interface of the laminar members, so a problem in that a performance and a quality of the core deteriorate can occur.

In addition, in order to apply the adhesive to the plurality of points for each forming portion of the laminar member, adhesive outlets of a number corresponding thereto are required, and as application points of the adhesive are more, it is difficult to precisely manage an adhesive application amount due to a processing deviation of a nozzle plug (also referred to as 'nozzle ball') for opening/closing the adhesive outlet and the adhesive outlet.

DISCLOSURE

Technical Problem

An object of the present invention is to provide an adhesive applicator for manufacturing a core, a core manufacturing apparatus, and an adhesive application method using the same, which can precisely apply an adhesive on material surface in order to manufacture a laminated core by an adhesion scheme.

Another object of the present invention is to provide an adhesive applicator, a core manufacturing apparatus, and an adhesive application method using the same, which can wide an adhesive application area.

Technical Solution

An aspect of the present invention provides an adhesive applicator for manufacturing a core, configured to apply an adhesive to a core material in order to bond interfaces of laminar members formed by blanking the core material.

The adhesive applicator may include: a nozzle body having at least one adhesive outlet; and a nozzle plug movably provided inside the nozzle body in order to open/close the adhesive outlet.

The adhesive outlet may include a nozzle hole for discharging the adhesive from the inside to the outside of the nozzle body, and the nozzle plug may include a plug body movably provided inside the nozzle body to selectively block the nozzle hole, and a plug tip formed to protrude on a fore-end surface of the plug body.

An inner surface of the adhesive outlet has a plug opposite surface facing the fore-end surface of the plug body and being selectively in surface-contact with the fore-end surface of the plug body by movement of the plug body, the plug opposite surface has a flat surface which is parallel to the fore-end surface of the plug body and orthogonal to an axis of the nozzle hole, and the plug tip is retreatably inserted to the nozzle hole formed on the plug opposite surface and protrudes out of the adhesive outlet.

The plug tip may have a tip portion of which thickness decreases toward a fore-end. In addition, the plug tip may also have a recess concavely formed on the fore-end surface of the plug tip.

The adhesive applicator may further include a plug hole passing through the nozzle plug and guiding the adhesive inside the nozzle body to the outside the adhesive outlet.

The adhesive applicator may further include an air flow path connected to the plug hole so that the adhesive inside the nozzle body is spouted to the outside through the plug hole.

The plug hole may have an introduction hole formed on an outer peripheral surface of the nozzle plug and a spouting hole formed at a fore-end of the nozzle plug.

Another aspect of the present invention provides a core manufacturing apparatus including: the adhesive applicator; and a blanking unit blanking the core material at one side of the adhesive applicator.

Yet another aspect of the present invention provides an adhesive application method using an adhesive applicator for manufacturing a core, the adhesive applicator including a nozzle body having at least one adhesive outlet and a nozzle plug movably provided inside a nozzle body in order to open/close the adhesive outlet, and applying the adhesive to a core material in order to bond interfaces of laminar members formed by blanking the core material.

The adhesive application method may include: a pressure type adhesive application step of applying the adhesive to the core material through the adhesive outlet in a state in which the nozzle plug is pressed by the core material transferred by a predetermined pitch; and a spouting type adhesive application step of spouting the adhesive to the core material through the nozzle plug before or after the pressure type adhesive application step in a state in which the transfer of the core material stops.

Advantageous Effects

The present invention has the following advantages.

First, according to the present invention, since machining accuracy and machining easiness of a nozzle plug for opening/closing an adhesive outlet and the adhesive outlet can be enhanced, an adhesive application amount can be precisely managed, and a height deviation of nozzle plugs can be minimized in an adhesive applicator having a plurality of adhesive outlets, and adhesive application amounts applied to a material can be uniformly managed by the plurality of adhesive outlets.

Second, according to the present invention, since it is possible to apply the adhesive even to a center of a portion contacted by the nozzle plug on the material surface, a bonding force between laminar members can be enhanced.

Third, according to the present invention, since an adhesive application area can be extended, an adhesion area between the laminar members can be increased, and interfacial splitting between the laminar members can be minimized or prevented.

DESCRIPTION OF DRAWINGS

Features and advantages of the present invention can be well appreciated with reference to drawings described below jointly with a detailed description for exemplary embodiments of the present invention to be described below, in which.

BEST MODE

Figure 1:
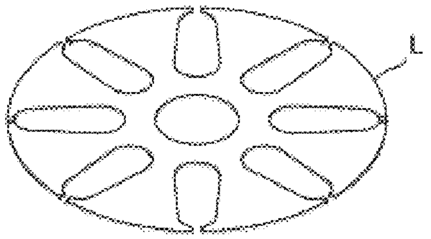
FIG. 1 is a perspective view illustrating an example of a laminar member and a laminated core.
Figure 1:
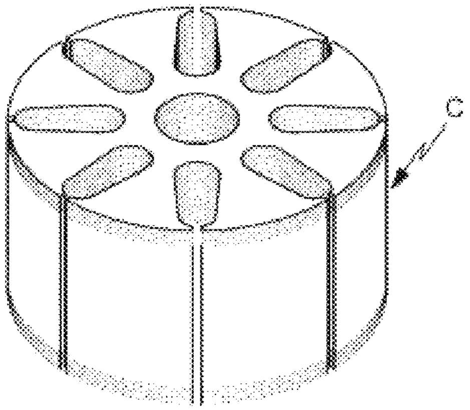

Hereinafter, preferred embodiments of the present invention, in which a purpose of the present invention can be realized in detail will be described with reference to the accompanying drawings. In describing the embodiments, the same name and the same reference numeral are used with respect to the same component and the resulting additional description will be omitted.

The term used herein is used to explain an embodiment of the present invention, and when an element is mentioned as "connected" or "accessed" to other element, although it may be directly connected or accessed, it should be understood that it also includes a connection relationship with another element in the middle, that is, a relationship of indirect connection.

In this specification, it should be understood that term "include" or "have" indicates that a feature, a number, a step, an operation, a component, a part or the combination thereof described in this specification is present, but does not exclude a possibility of presence or addition of one or more other features, numbers, steps, operations, components, parts or combinations thereof, in advance.

Figure 2:
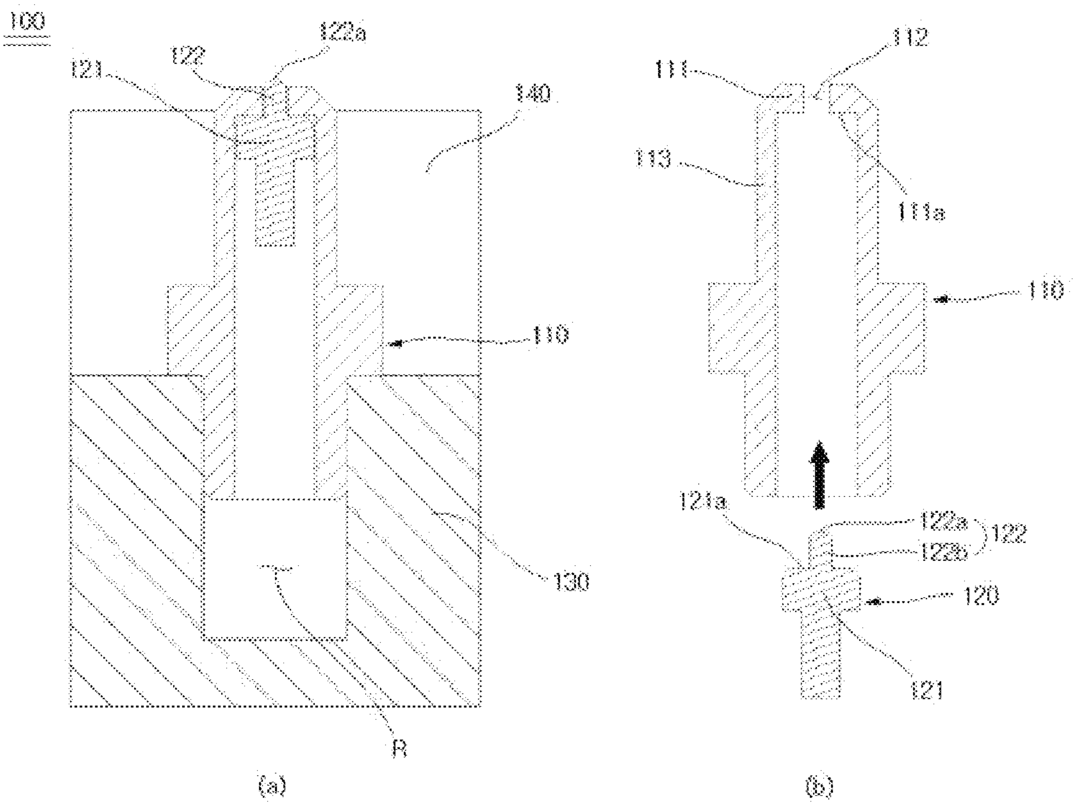
FIG. 2 is a cross-sectional view illustrating an embodiment of an adhesive nozzle applicable to an adhesive applicator according to the present invention.
Figure 3:
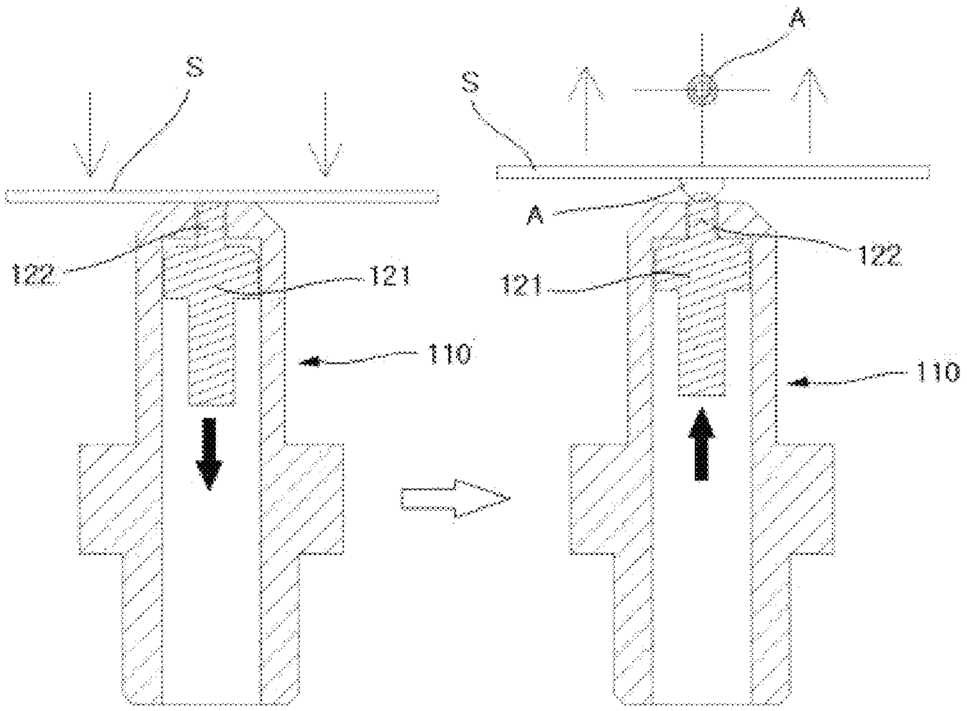
FIG. 3 is a cross-sectional view illustrating an adhesive application process by the adhesive nozzle illustrated in FIG. 2.
Figure 4:
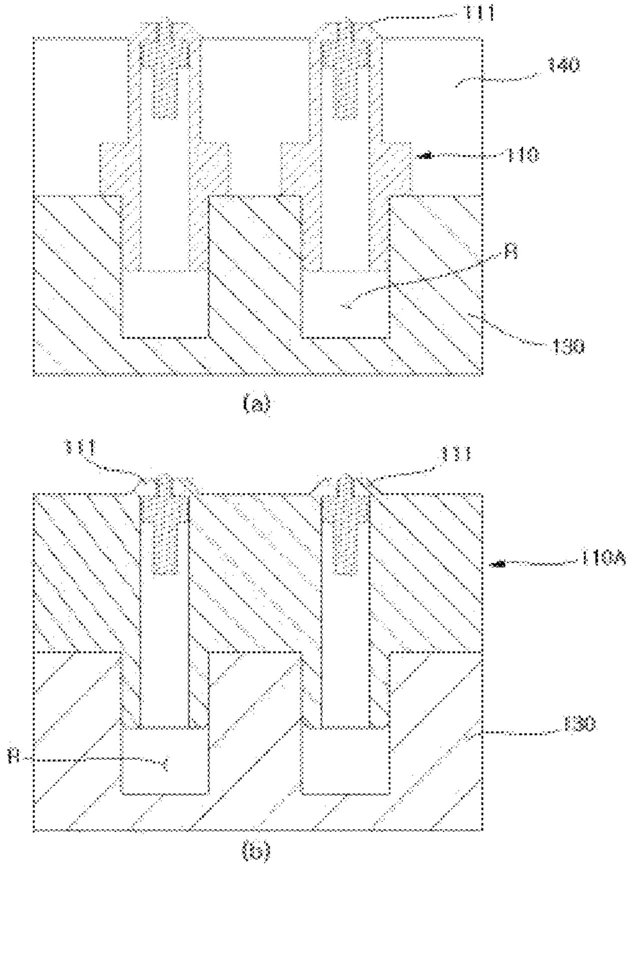
FIG. 4 is a cross-sectional view illustrating exemplary embodiments of the adhesive applicator according to the present invention.
Figure 5:
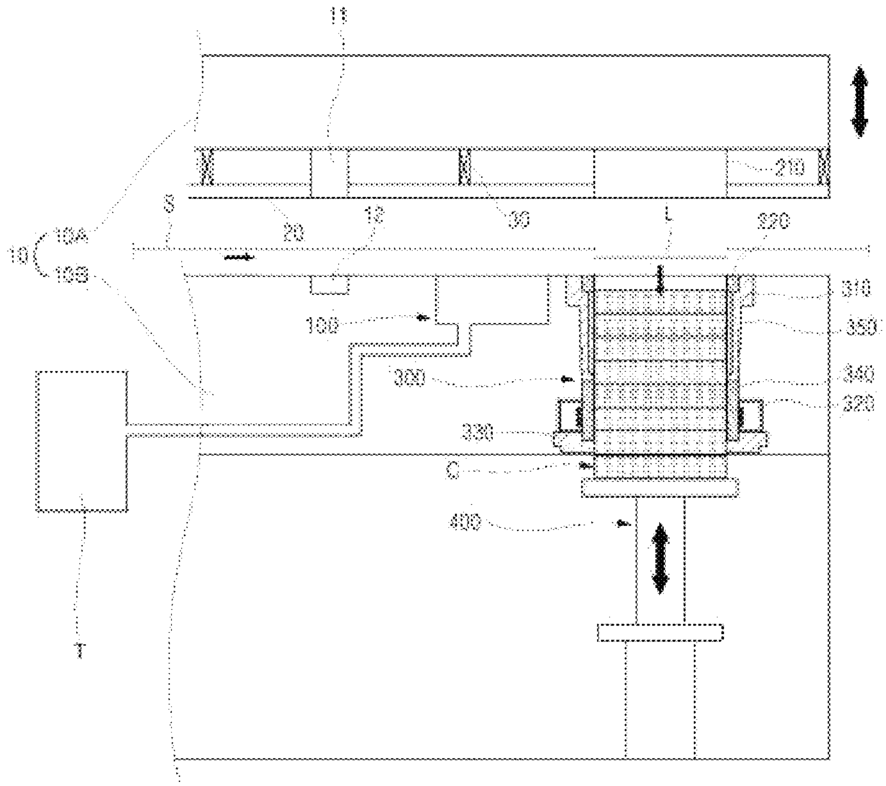
FIG. 5 is a diagram illustrating a progressive die type laminated core manufacturing apparatus as an embodiment of an adhesive laminated core manufacturing apparatus according to the present invention.

Hereinafter, an adhesive applicator according to an embodiment of the present invention will be described in detail with reference to FIGS. 2 to 5. FIG. 2 is a cross-sectional view illustrating an embodiment of an adhesive nozzle applicable to an adhesive applicator according to the present invention, FIG. 3 is a cross-sectional view illustrating an adhesive application process by the adhesive nozzle illustrated in FIG. 2, FIG. 4 is a cross-sectional view illustrating exemplary embodiments of the adhesive applicator according to the present invention, and FIG. 5 is a diagram illustrating a progressive die type laminated core manufacturing apparatus as an embodiment of an adhesive laminated core manufacturing apparatus according to the present invention.

Referring to FIGS. 2 to 5, the adhesive applicator according to an embodiment of the present invention is an apparatus that applies an adhesive to a core material in order to bond an interface of laminar members formed by blanking the core material, more specifically, a material for manufacturing the laminated core.

The laminated core manufacturing apparatus according to an embodiment of the present invention is an apparatus that manufactures the laminated core by bonding the interfaces of laminar members, the laminated core manufacturing apparatus may be implemented in a structure of manufacturing the laminated core by integrating a plurality of laminar members by an interface (boundary surface) adhesion, the laminar members being formed by blanking of a metal strip such as an electrical steel plate.

The adhesive applicator 100 applies the adhesive to the surface of the material, i.e., the metal strip for interface adhesion of the laminar members forming the core of the laminated structure, i.e., the laminated core, and the adhesive is interposed on the interface of the laminar members by the adhesive applicator 100. More specifically, the adhesive applicator 100 may also apply the adhesive to a plurality of points on the surface of the material for the interface adhesion of the laminar members.

For example, the adhesive applicator 100 applies the adhesive to each portion where the laminar member L is formed in a metal strip S which is transferred by a predetermined distance, i.e., 1 pitch every predetermined timing, more specifically, each area where the laminar member is scheduled to be formed.

The laminated core manufacturing apparatus may be implemented as an apparatus, in particular, a progressive die type apparatus that applies the adhesive to metal strips S which is continuously transferred, sequentially forms the laminar members by blanking the metal strip, and manufactures the laminated core by the adhesion method, that is, a bonding scheme.

In the progressive die type laminated core manufacturing apparatus, the adhesive applicator 100 applies the adhesive to the material S which is intermittently transferred by each 1 pitch every predetermined timing.

The adhesive applicator 100 according to the embodiment includes an adhesive nozzle 100A for discharging the adhesive. In addition, the adhesive nozzle 100A includes a nozzle body 110 having at least one adhesive outlet 111 and a nozzle plug 120 for opening/closing the adhesive outlet 111.

More specifically, the nozzle plug 120 is movable provided inside the nozzle body 110. And the adhesive outlet 111 has a nozzle hole 112 for discharging the adhesive from the inside to the outside of the nozzle body 110. In the present invention, the adhesive outlet 111 is a portion where the adhesive is discharged, i.e., a portion where the nozzle hole is formed, regardless of its shape.

As in the example illustrated in FIGS. 2 to 5, when the material S is positioned at an upper side of the nozzle body 110, the nozzle hole 112 passes through an upper portion of the nozzle body 110.

And as this embodiment, the nozzle plug 120 may include a plug body 121 movably provided inside the nozzle body and a plug tip 122 formed in the plug body 121.

The plug body 121 is movably provided inside the nozzle body 110 to selectively block the nozzle hole 112. And the plug tip 122 is formed to protrude on a fore-end surface 121*a* of the plug body.

More particularly, an inner surface of the adhesive outlet 111 has a plug opposite surface 111*a* facing the fore-end surface of the plug body. The plug opposite surface 111*a* has a plane, i.e., a flat surface which is parallel to the fore-end surface 121*a* of the plug body, orthogonal to an axis of the nozzle hole, and selectively in surface-contact with the fore-end surface 121*a* of the plug body by movement of the plug body 121.

The plug tip 122 is retreatably inserted to the nozzle hole 112 formed on the plug opposite surface 111*a* and protrudes out of the adhesive outlet 111.

Therefore, the fore-end surface of the plug body 121 also becomes a plane orthogonal to the axis of the nozzle hole 112 and the axis of the plug tip 122. And inside structure of the adhesive outlet 111, the nozzle hole, and the nozzle plug can be machined precisely and easily, and height of the plug tips may be uniformly regulated.

In this embodiment. when the plug body 121 moves toward the nozzle hole 112 and is in close contact with the plug opposite surface 111*a*, a tip-end portion of the plug tip 122 is projected to the outside of the nozzle hole 112 by a predetermined distance, and the fore-end surface of the plug body 121 blocks the nozzle hole 112.

And, when the plug tip 122 is pressed, the nozzle hole 112 is opened by retreating (descent) of the plug body 121, and as a result, the adhesive is discharged through the nozzle hole 112. For example, when the plug body 121 is retreated, the adhesive accommodated in the nozzle body 110 is discharged to the outside by an internal pressure of the nozzle body 110 relatively higher than an external pressure of the nozzle body 110.

An internal size of the nozzle hole 112 is larger than a thickness of the plug tip 122, and as a result, there is a gap for discharging the adhesive between the path of the nozzle hole 112 and the plug tip 122. For example, there may be a structure (movable fit) in which an inner diameter of the nozzle hole 112 is larger than an outer diameter of the plug tip 122).

In addition, the plug tip 122 may also have a tip portion 122*a* of which thickness decreases toward a fore-end. That is, the plug tip 122 may include an shaft portion 122*b* with a constant thickness and the tip portion 122*a* formed at the fore-end of the shaft portion 122*b* and having a thickness decreasing gradually. The tip portion 122*a* of the plug tip may have a cross-sectional shape in which edges of the fore-end are diagonal or round, a conical shape, or a pyramid.

Therefore, when the adhesive is discharged through the nozzle hole 112 while the fore-end of the plug tip 122 is pressed by the material S, the contact area between the plug tip 122 and the material may be reduced, and a non-application area of the adhesive by the contact of the plug tip 122 may be reduced. However, in order to uniformly manage the height of the plug tips, it is preferable that the fore-end of the plug tip is flat considering machining accuracy and easiness of the plug tip 122.

A cavity for accommodating the adhesive is formed in the nozzle body 110, and in this embodiment, the plug body 121 has a cylindrical shape, the cavity of the adhesive outlet 111 has the cylindrical shape corresponding to the shape of the plug body, but the shape of the cavity and the adhesive outlet 111 are not limited to the above-described shape, and for example, a shape of a cross section orthogonal to the axis of the plug tip 122 may have a polygonal shape.

And, so that the adhesive may be supplied between the plug opposite surface 111*a*, and the fore-end surface 121*a* of the plug body, there may be a gap for adhesive flowing between the plug body 121 and a cylinder 113 surrounding the plug body 121, or/and there may be an adhesive supply hole (not shown) passing through the plug body 121. In this embodiment, the plug body 121 and the plug tip 122 are formed as one body, and the plug tip 122 is provided at the center of the plug body.

Referring to FIG. 3, when the plug tip 122 is pressed toward inside of the nozzle body 110 by the material S, the adhesive (A) is discharged through the nozzle hole 112 and applied on the surface of the material. That is, the adhesive applicator may include a pressure type adhesive nozzle as in this embodiment.

Although not shown in drawings, the nozzle plug 120 may be elastically supported onto the nozzle hole 112 by an elastic member provided inside the nozzle body 110, e.g., a coil spring, and the nozzle plug 120 is pushed toward the plug opposite surface by the elastic member to close the nozzle hole 112, as in an example disclosed in Korean Patent Laid-open Publication No. 10-2015-0136877. Of course, the nozzle plug 120 may also be pressed to the nozzle hole 112 by the adhesive pressure inside the nozzle body.

The adhesive applicator 100 may also include a plurality of nozzle bodies 110 each having a single adhesive outlet as illustrated in FIG. 4(*a*), and in such a structure, the nozzle bodies 110 may be assembled to a base block 130 supporting the nozzle bodies 110, and fixed by a nozzle holder 140. The nozzle holder may be fixed to the base block by a fastening element such as a bolt. Since a fixing method of the nozzle body 110 to a die described below, e.g., a lower die is known, an additional description regarding the fixing method of the nozzle body is omitted.

The adhesive applicator 100 may also include a nozzle body 110A having the plurality of adhesive outlets 111 as illustrated in FIG. 4(*b*). As a result, the embodiments of the adhesive applicator 100 according to the present invention may simultaneously apply the adhesive to a plurality of points. The nozzle body 110A having the plurality of adhesive outlets 111 may be fixed to the base block by the fastening element such as the bolt or fixed to the base block by a nozzle holder.

In the examples illustrated in FIG. 4, the adhesive outlet 111 is projected on the surface of the adhesive applicator, but is not limited thereto. For example, a non-projection type that the adhesive outlet 111 is not projected on the surface of the adhesive applicator is also available.

The adhesive applicator 100 may be supplied with the adhesive from an adhesive supplier T, and the adhesive supplier T may pressurize and supply the adhesive to the adhesive applicator with an air pressure, but a supplying way of the adhesive is not limited thereto, and for example, the adhesive may also be supplied by a piston. In addition, the adhesive transferred from the adhesive supplier is accommodated in an internal space R of the adhesive applicator which is in communication with the nozzle body 110.

The adhesive applicator 100 may be provided on the progressive die type core manufacturing apparatus as illustrated in FIG. 5, and when the plug tip 122 is pressed toward inside of the nozzle body 110 by the material S which is transferred by one pitch, the adhesive is discharged through the nozzle hole 112 and applied on the surface of the material.

As described above, the adhesive applicator 100 is applied to the progressive die type laminated core manufacturing apparatus, and in this case, the adhesive applicator 100 is provided in dies 10, and the adhesive discharged through the nozzle hole 112 is applied to the surface of the metal strip S.

In the embodiment, the dies 19 includes an upper die 10A which is elevatable and a lower die 10B provided below the upper die 10A, and the metal strip S is supplied between the upper die and the lower die to intermittently pass between the upper die and the lower die by a predetermined length, that is, one pitch at a time. And the adhesive applicator 100 is provided at the lower die 10B and discharges the adhesive upward.

Conversely, the adhesive applicator 100 can be provided at the upper die 10A and discharge the adhesive downward, and accordingly the adhesive may also be applied on an upper surface of the metal strip S.

A pushing plate 20 is provided at the upper die 10A. The pushing plate presses the metal strip S downward when the upper die 10A moves down, and serves as a stripper when the upper die 10A moves up. Since the pushing plate serving as the stripper in a progressive die is a known device, therefore an additional description regarding the pushing plate is omitted. Reference numeral 30 represents a spring that elastically supports the pushing plate 20.

As described above, the embodiment of the laminated core manufacturing apparatus may be implemented as the progressive die type apparatus including the adhesive applicator 100, apply the adhesive to the metal strip S which is intermittently transferred, and form the laminar members L sequentially by periodically blanking the metal strip S. And predetermined sheets of the laminar member L are integrated into one and form the laminated core C.

The laminated core manufacturing apparatus according to an embodiment of the present invention includes the adhesive applicator 100 and a blanking unit 200 for forming the laminar members L by blanking the material S. The blanking unit 200 punches the material S at one side of the adhesive applicator 100, more specifically, downstream (based on a moving direction of the material) of the adhesive applicator 100.

The blanking unit 200 includes a blanking punch 210 and a blanking die 220 facing the blanking punch, and in this embodiment, the blanking punch 210 is provided at the upper die 10A and the blanking die 220 is provided at the lower die 10B.

A lamination unit 300 aligning, laminating, and integrating the laminar members is provided below the blanking die 220. The lamination unit 300 may include a squeeze ring 310 installed at a lower side of the blanking die 220. And the squeeze ring 310 may induce aligned lamination and straight passing of the laminar members L, below the blanking die 220.

The squeeze ring 310 is an element that makes the laminar members L sequentially formed by an interaction of the blanking punch and the blanking die to pass downward while aligning the laminar members L on the same axis, and guides alignment and movement of the laminar members L. The squeeze ring 310 is technology known to those skilled in this art.

The blanking punch and the blanking die 220 as devices blanking the material, i.e., the metal strip S for manufacturing the laminar members L, sequentially form the laminar members L by blanking the metal strip S, and the planking punch pushes the laminar member L formed simultaneously with blanking the material into the squeeze ring 310.

In addition, a back pressure unit 400 may be provided below the lamination unit 300 including the squeeze ring 310, which supports the bottom of the laminated core C discharged from the lamination unit 300.

In this embodiment, the lamination unit 300 forms the laminated core C while the laminar members L input from above the squeeze ring 310 pass in a laminated state. More specifically, the lamination unit 300 continuously forms the laminated cores C by integrating the laminar members L in plural sheets by the bonding, the laminar members L passing through the lamination unit 300 from the top to the bottom, and discharges the laminated cores C downward.

The back pressure unit 400 is elevatably provided below the lamination unit 300 so as to sequentially support the laminated cores C one by one, discharged from the lamination unit 300. The back pressure unit 400 moves toward a lower end (outlet) of the lamination unit 300 and supports a bottom of the laminated core C discharged from the lamination unit 300, and moves down while backing the laminated core C. After unloading of one laminated core from the back pressure unit, the back pressure unit moves up again and backs the bottom of a next laminated core. Since the function of the back pressure unit and an extraction mechanism of the laminated core are known technologies in this art, an additional description thereof is omitted.

The lamination unit 300 of this embodiment forms the laminated core C while making the laminar members L to pass as described above, and integrates the laminar members L in predetermined sheets in order to form the laminated core.

To this end, the lamination unit 300 may include a heater 320 that implements curing of the adhesive by heating, and integrates the laminar members L in plural sheets. The lamination unit 300 may further include a pincher 330 for preventing the laminated core C from falling.

The pincher 330 is an element that makes the laminated core C in a lower section of the lamination unit 300 is provided under the squeeze ring 310. For example, as the pincher, a tubular shape device which is extensible flexibly to press a circumference of the laminated core C and has restoration force or a device which presses the circumference of the laminated core by using the elastic force of the spring may be adopted.

A guide 340 guiding the laminar members L may also be provided between the squeeze ring 310 and the pincher 330. In this embodiment, the heater 320 is provided between the squeeze ring 310 and the pincher 330, and the guide 340 is provided inside the heater 320, but the present invention is not limited thereto.

In addition, the laminar member L passing the inside of the heater 320 is heated by the heater 320, and as a result, the adhesive between the laminar members is cured by heat. For example, a high-frequency induction heating device may be adopted as the heater 320, but the type of heater is not limited thereto.

As described above, the laminated core manufacturing apparatus according to this embodiment heats to cure the adhesive which is present between the laminar members L, and integrates a predetermined sheets of laminar member by bonding in order to form the laminated core C.

The pincher 330 is a device that forms a movement passage of the laminated core below the heater 320, and a device that grips the laminated core with predetermined force by pressing the circumference of the laminated core C, more specifically, a device that applies side pressure. Therefore, the pincher 330 may prevent the laminated core discharged from the lamination unit 300 from being dropped before being supported by the back pressure unit 400.

A cooling system for cooling the lamination unit 300 and its surroundings may be applied to the lower die 10B, and a heat insulation member, i.e., a heat blocking material for blocking heat conduction may also be provided between components of the lamination unit 300.

In addition, the upper die 10A may also further include at least one punch 11 for forming a slot or a hole (e.g., a center hole of the laminar member), and a die hole 12 facing the punch 11 may be provided on the lower die 10B. Since examples of punching devices provided in the upper die and the lower die for processing the shape of the laminar member are variously known in the progressive die apparatus, therefore its additional description is omitted.

In FIG. 5, laminar members L laminated vertically inside the lamination unit 300 are separated based on a solid line, and a boundary surface marked with dotted lines represents interfaces (adhesive interfaces) where interlayer bonding is made. The adhesive applicator 100 skips adhesive application at a predetermined timing so that the laminated cores C may be separated based on the solid line. For example, the adhesive applicator 100 moves down at a predetermined height to prevent a contact between the material S and the nozzle plug 120, every time (idle process) when the adhesive application is skipped.

In addition, the lamination unit 300 may also rotate the laminar members at a predetermined angle for index lamination. For example, the squeeze ring 310 and the pincher 330 may rotate simultaneously at the same angular velocity.

Since the basic technology manufacturing an adhesive type laminated core by blanking the metal strip to form the laminar members and integrating the laminar members is well known in this art, therefore an additional description thereof is omitted.

Figure 6:
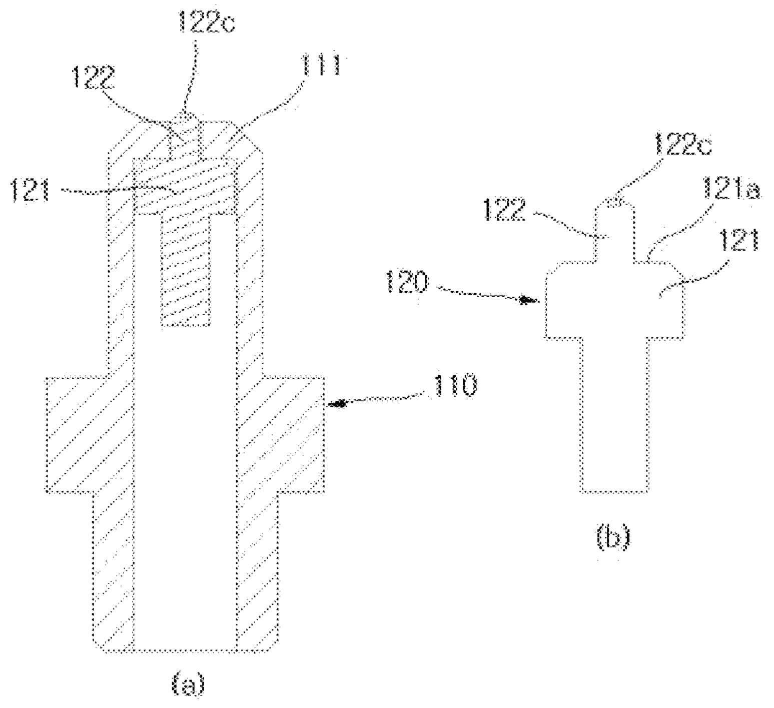
FIG. 6 is a cross-sectional view illustrating another exemplary embodiment of the adhesive nozzle applicable to the adhesive applicator according to the present invention.

Meanwhile, as shown in FIG. 6, the plug tip 122 may also have a recess 122*c* concavely formed on the fore-end surface of the plug tip. A part of the adhesive discharged from the nozzle hole 112 can be filled in the recess 122*c*. Accordingly, it is possible to apply the adhesive to the center of a portion which the plug tip 122 contacts, and bonding force between the laminar members may be enhanced.

Figure 7:
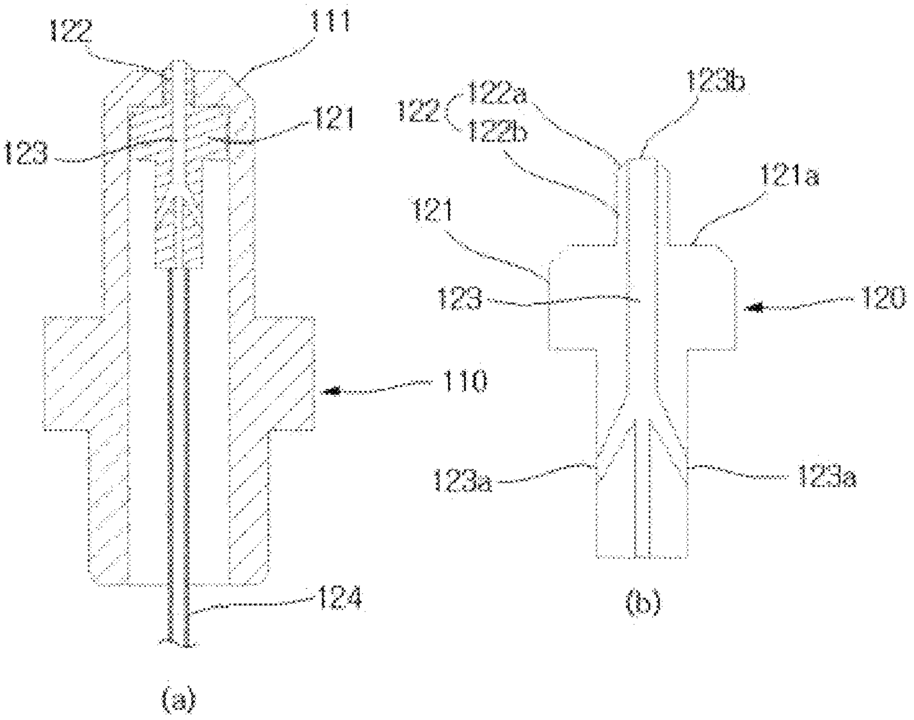
FIG. 7 is a cross-sectional view illustrating yet another exemplary embodiment of the adhesive nozzle applicable to the adhesive applicator according to the present invention.
Figure 8:
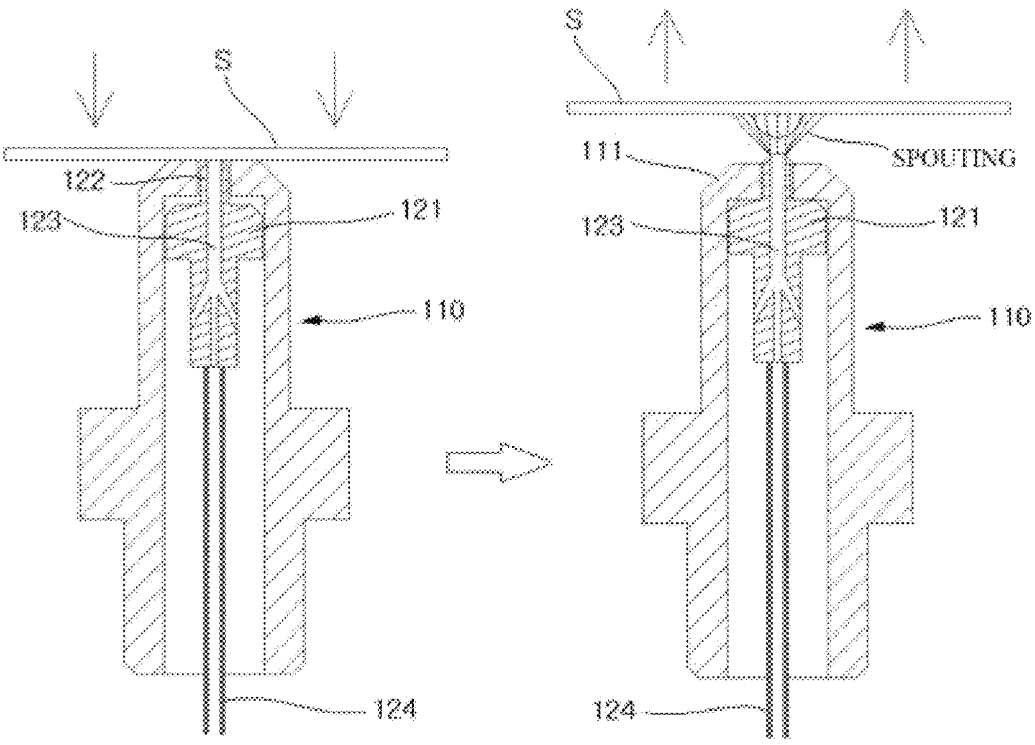
FIG. 8 is a cross-sectional view illustrating an adhesive application process by the adhesive nozzle illustrated in FIG. 7.

Next, referring to FIGS. 7 and 8, the adhesive applicator 100 may further include a plug hole 123 that passes through the nozzle plug 120 and guides the adhesive inside the nozzle body 110 to the outside of the adhesive outlet 111.

In addition, an air flow path 124 may be connected to the plug hole 123 so that the adhesive inside the nozzle body 110 is spouted to the outside through the plug hole 123. A pneumatic device (not illustrated) transferring air to the nozzle plug 120 with a pressure higher than an external pressure of the adhesive outlet may be connected to the air flow path 124 and eject the adhesive by a spray way.

In this embodiment, the plug hole 123 may have an introduction hole 123*a* formed on a circumferential surface of the nozzle plug and a spouting hole 123*b* formed at the nozzle plug 120, more specifically, the fore-end of the plug tip 121.

Therefore, in a state in which the material S is spaced apart from the fore-end of the plug tip 122, the adhesive may be spouted (spouting type adhesive application) at the plug tip 122 by air pressure, and the adhesive may be widely applied to the surface of the material. In addition, the adhesive may be discharged through the nozzle hole 112 in a state in which the material S presses the plug tip 122 and the plug body 121 is thus retreated to inside of the nozzle body.

For a time when the spouting type adhesive application stops, e.g., while the material is transferred, a small amount of adhesive may also be leaked through the plug hole by the pressure inside the nozzle body, but by various methods such as controlling the pressure inside the nozzle body to be the same as an external pressure, e.g., an atmospheric pressure, or controlling the pressure of the air flow path, or using a vacuum breaker or a valve, the leakage of the adhesive through the plug hole can be prevented.

The present invention may provide an adhesive application method using the adhesive applicator which includes a nozzle body having at least one adhesive outlet and a nozzle plug movably provided inside the nozzle body in order to open/close the adhesive outlet, and applies the adhesive to the material in order to bond interfaces of the laminar members formed by blanking the core material.

An embodiment of the adhesive application method according to the present invention may include a pressure type adhesive application step and a spouting type adhesive application step.

The pressure type adhesive application step includes a step of applying the adhesive to the material through the adhesive outlet in a state in which the nozzle plug is pressed by the material transferred by predetermined 1 pitch. In addition, the spouting type adhesive application step includes a step of spouting the adhesive to the material through the nozzle plug before and/or after the pressure type adhesive application step in a state in which the transfer of the material stops.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Therefore, it should be understood by those skilled in the art that these embodiments are given by way of illustration only and the present invention is not limited thereto, and that various modifications, variations, and alterations can be made by those skilled in the art without departing from the spirit and scope of the present invention. Therefore, the scope of the invention should be limited only by the accompanying claims and equivalents thereof.

INDUSTRIAL APPLICABILITY

The present invention relates to a core manufacturing apparatus, and various types of cores such as a rotor core and a stator core may be manufactured in a laminate structure, and an adhesive application amount applied to the material may be uniformly managed.

The invention claimed is:

1. An adhesive applicator for manufacturing a core, configured to apply an adhesive to a core material in order to bond interfaces of laminar members formed by blanking the core material, comprising:

a nozzle body having at least one adhesive outlet;

a nozzle plug movably provided inside the nozzle body in order to open/close the adhesive outlet; and a plug hole passing through the nozzle plug and guiding an adhesive inside the nozzle body to an outside of the adhesive outlet, wherein the adhesive outlet includes a nozzle hole for discharging the adhesive to the outside of the nozzle body, wherein the nozzle plug includes a plug body movably provided inside the nozzle body to selectively block the nozzle hole, and a plug tip formed to protrude on a fore-end surface of the plug body, wherein an inner surface of the adhesive outlet has a plug opposite surface facing the fore-end surface of the plug body and being selectively in surface-contact with the fore-end surface of the plug body by movement of the plug body, wherein the plug opposite surface has a flat surface which is parallel to the fore-end surface of the plug body and orthogonal to an axis of the nozzle hole, and wherein the plug tip is retreatably inserted to the nozzle hole formed on the plug opposite surface and protrudes out of the adhesive outlet.

2. The adhesive applicator of claim 1, wherein the plug tip has a tip portion a thickness of which decreases toward a fore-end.

3. The adhesive applicator of claim 1, further comprising:

an air flow path connected to the plug hole so that the adhesive inside the nozzle body is spouted to the outside through the plug hole.

4. The adhesive applicator of claim 3, wherein the plug hole has an introduction hole formed on an outer peripheral surface of the nozzle plug and a spouting hole formed at the fore-end of the nozzle plug.

5. The adhesive applicator of claim 1, wherein the plug hole has an introduction hole formed on an outer peripheral surface of the nozzle plug and a spouting hole formed at the fore-end of the nozzle plug.

6. The adhesive applicator of claim 1, wherein the plug tip has a tip portion a thickness of which decreases toward a fore-end.

7. A core manufacturing apparatus comprising:

an adhesive applicator configured to apply an adhesive to a core material in order to bond interfaces of laminar members formed by blanking the core material; and a blanking unit blanking the core material at one side of the adhesive applicator;

the adhesive applicator comprising a nozzle body having at least one adhesive outlet, a nozzle plug movably provided inside the nozzle body in order to open/close the adhesive outlet, and a plug hole passing through the nozzle plug and guiding an adhesive inside the nozzle body to an outside of the adhesive outlet;

wherein the adhesive outlet includes a nozzle hole for discharging the adhesive from the inside to the outside of the nozzle body, wherein the nozzle plug includes a plug body movably provided inside the nozzle body to selectively block the nozzle hole, and a plug tip formed to protrude on a fore-end surface of the plug body, wherein an inner surface of the adhesive outlet has a plug opposite surface facing the fore-end surface of the plug body and being selectively in surface-contact with the fore-end surface of the plug body by movement of the plug body, wherein the plug opposite surface has a flat surface which is parallel to the fore-end surface of the plug body and orthogonal to an axis of the nozzle hole, and wherein the plug tip is retreatably inserted to the nozzle hole formed on the plug opposite surface and protrudes out of the adhesive outlet.

8. The core manufacturing apparatus of claim 7, wherein the plug tip has a tip portion of which thickness decreases toward a fore-end.

9. The core manufacturing apparatus of claim 7, further comprising:

an air flow path connected to the plug hole so that the adhesive inside the nozzle body is spouted to the outside through the plug hole.

10. The core manufacturing apparatus of claim 9, wherein the plug hole has an introduction hole formed on an outer peripheral surface of the nozzle plug and a spouting hole formed at the fore-end of the nozzle plug.

11. The core manufacturing apparatus of claim 7, wherein the plug hole has an introduction hole formed on an outer peripheral surface of the nozzle plug and a spouting hole formed at the fore-end of the nozzle plug.

12. An adhesive applicator for manufacturing a core, configured to apply an adhesive to a core material in order to bond interfaces of laminar members formed by blanking the core material, comprising:

a nozzle body having at least one adhesive outlet; and a nozzle plug movably provided inside the nozzle body in order to open/close the adhesive outlet, wherein the adhesive outlet includes a nozzle hole for discharging the adhesive from an inside to an outside of the nozzle body, wherein the nozzle plug includes a plug body movably provided inside the nozzle body to selectively block the nozzle hole, and a plug tip formed to protrude on a fore-end surface of the plug body, wherein an inner surface of the adhesive outlet has a plug opposite surface facing the fore-end surface of the plug body and being selectively in surface-contact with the fore-end surface of the plug body by movement of the plug body, wherein the plug opposite surface has a flat surface which is parallel to the fore-end surface of the plug body and orthogonal to an axis of the nozzle hole, and wherein the plug tip is retreatably inserted to the nozzle hole formed on the plug opposite surface and protrudes out of the adhesive outlet, wherein the plug tip has a closed recess formed concavely on a fore-end surface of the plug tip such that a part of the discharged adhesive is filled in the closed recess.

* * * * *